(12) United States Patent
Berenberg et al.

(10) Patent No.: US 8,832,781 B2
(45) Date of Patent: Sep. 9, 2014

(54) SECURE KEY SELF-GENERATION

(75) Inventors: Paul Berenberg, Mountain View, CA (US); Georgi Danielyan, Yerevan (AM)

(73) Assignee: Cubic Corporation, San Diego, CA (US)

( * ) Notice: Subject to any disclaimer, the term of this patent is extended or adjusted under 35 U.S.C. 154(b) by 8 days.

(21) Appl. No.: 13/617,436

(22) Filed: Sep. 14, 2012

(65) Prior Publication Data

US 2013/0074145 A1    Mar. 21, 2013

Related U.S. Application Data

(60) Provisional application No. 61/535,047, filed on Sep. 15, 2011.

(51) Int. Cl.
*H04L 29/06* (2006.01)
*G06F 21/71* (2013.01)

(52) U.S. Cl.
CPC ........................... *G06F 21/71* (2013.01)
USPC .................................. 726/1; 726/2

(58) Field of Classification Search
CPC ... G06F 21/71; G06F 21/6218; H04L 9/0897; H04L 9/0869; H04L 9/0825; H04L 9/3234; H04L 63/20; H04L 63/102
See application file for complete search history.

(56) References Cited

U.S. PATENT DOCUMENTS

| | | | |
|---|---|---|---|
| 6,005,943 A * | 12/1999 | Cohen et al. | 380/30 |
| 6,202,153 B1 | 3/2001 | Diamant et al. | |
| 2005/0177741 A1 | 8/2005 | Chen et al. | |
| 2007/0014396 A1 * | 1/2007 | Miyauchi et al. | 380/28 |
| 2010/0023747 A1 | 1/2010 | Asnaashari et al. | |
| 2010/0067689 A1 * | 3/2010 | Laffey | 380/44 |
| 2010/0229004 A1 | 9/2010 | Asnaashari | |
| 2012/0084560 A1 * | 4/2012 | Jayaraman | 713/164 |
| 2012/0224695 A1 * | 9/2012 | Hashimoto et al. | 380/279 |

OTHER PUBLICATIONS

International Search Report and Written Opinion of PCT/US2012/055601 mailed on Jan. 10, 2013, 8 pages.
International Preliminary Report on Patentability issued in International Application No. PCT/US2012/055601 on Mar. 27, 2014.

* cited by examiner

*Primary Examiner* — Kambiz Zand
*Assistant Examiner* — Ghodrat Jamshidi
(74) *Attorney, Agent, or Firm* — Kilpatrick Townsend & Stockton LLP

(57) ABSTRACT

Techniques are disclosed for providing secure critical security parameter (CSP) generation in an integrated circuit (IC). Embodiments generally include determining that an ability to read the CSP externally (e.g., through a debug interface) has been disabled before the CSP is generated. Depending on the functionality of the device, embodiments can include other steps, such as determining whether software for executing a method for providing a secure CSP is being run for a first time. Among other things, the techniques provided herein for providing secure CSP generation can increase the security of the CSP and reduce manufacturing costs of the IC.

20 Claims, 5 Drawing Sheets

SECURE KEY SELF-GENERATION

CROSS-REFERENCE TO RELATED APPLICATION

The present application claims benefit under 35 USC 119 (e) of 61/535,047, filed Sep. 15, 2011, entitled "METHOD OF SECURE KEYS SELF GENERATION ELIMINATING THE RISK OF THE INITIAL KEYS BEING COMPROMISED IN MANUFACTURING", the entire contents of which are incorporated by reference herein for all purposes.

BACKGROUND

Microcontrollers, microprocessors, and other integrated circuits (ICs) often can employ critical security parameters (CSPs), such as cryptographic keys, authentication data, or other sensitive data which can be utilized to provide additional security or other functionality. The disclosure or modification of these CSPs can compromise this functionality.

CSPs are often delivered to the IC in a secure manufacturing or provisioning environment. This can raise issues regarding the security of the CSPs. For example a manufacturer could potentially circumvent these secure procedures, failing to install a CSP or installing an incorrect, repeating, changed, prohibited, etc. CSP by mistake, or as a result of a malicious action. CSP self-generation by the IC, and manual or automatic delivery of the CSP to secure storage outside the device in a secure manner, can help avoid some of these issues, but a CSP may still be compromised through a debug interface that can allow a party to intercept the key or meddle with it through the device debug interface. All of these methods apply to both symmetric and asymmetric keys.

BRIEF SUMMARY

Techniques are disclosed for providing secure critical security parameter (CSP) generation in an integrated circuit (IC). Embodiments generally include determining that an ability to read the CSP externally (e.g., through a debug interface) has been disabled before the CSP is generated. Depending on the functionality of the device, embodiments can include other steps, such as determining whether software for executing a method for providing a secure CSP is being run for a first time. Among other things, the techniques provided herein for providing secure CSP generation can increase the security of the CSP and reduce manufacturing costs of the IC.

An example computer-implemented method for providing secure critical security parameter CSP generation for an integrated circuit, according to the disclosure, can include determining that the computer-implemented method is being executed by the integrated circuit for a first time, determining that an ability to access a secure memory of the integrated circuit via an interface of the integrated circuit has been disabled, generating at least one CSP, and storing the at least one CSP in the secure memory of the integrated circuit.

The example computer-implemented method for providing secure critical security parameter CSP generation for an integrated circuit can include one or more of the following functions and/or features. The method can include protecting the at least one CSP from being erased from the secure memory of the integrated circuit. The method can include determining that the computer-implemented method is being executed by the integrated circuit for a second time, determining, while the computer-implemented method is being executed by the integrated circuit for the second time, that the ability to access the secure memory of the integrated circuit via the interface of the integrated circuit to has not been disabled, preventing normal operation of the integrated circuit. The normal operation of the integrated circuit can be prevented by putting the integrated circuit into an error or halt state. The interface of the integrated circuit can be a debugging interface. The at least one CSP can comprise a public/private pair of encryption keys. The CSP can be generated by the integrated circuit. The method can include rebooting the integrated circuit after storing the at least one CSP in the secure memory of the integrated circuit.

An example non-transitory computer-readable medium having instructions embedded thereon for providing CSP generation for an integrated circuit, according to the description, can have instructions with computer-executable code for determining that the computer-executable code is being executed by the integrated circuit for a first time, determining that an ability to access a secure memory of the integrated circuit via an interface of the integrated circuit has been disabled, generating at least one CSP, and storing the at least one CSP in the secure memory of the integrated circuit.

The example non-transitory computer-readable medium can also include one or more of the following features. The medium can include computer-executable code for protecting the at least one CSP from being erased from the secure memory of the integrated circuit. The medium can include computer-executable code for determining that the computer-executable code is being executed by the integrated circuit for a second time, determining, while the computer-executable code is being executed by the integrated circuit for the second time, that the ability to access the secure memory of the integrated circuit via the interface of the integrated circuit to has not been disabled, and preventing normal operation of the integrated circuit. The computer-executable code for preventing the normal operation of the integrated circuit can include computer-executable code for putting the integrated circuit into an error or halt state. The interface of the integrated circuit can be a debugging interface. The at least one CSP can comprise a public/private pair of encryption keys.

An example integrated circuit capable of providing CSP generation, according to the disclosure, can include a secure memory, an interface, and processing circuitry, coupled to the secure memory and the interface, and configured to execute a process. The process can include determining that the process is being executed by the processing circuitry for a first time, determining that an ability to access the secure memory via the interface has been disabled, generating at least one CSP, and storing the at least one CSP in the secure memory.

The example integrated circuit capable of providing CSP generation can include one or more of the following features. The processing circuitry can be configured to protect the at least one CSP from being erased from the secure memory. The process that the processing circuitry is configured to execute can also include determining that the process is being executed by the processing circuitry for a second time, determining, while the process is being executed by the processing circuitry for the second time, that the ability to access the secure memory via the interface has not been disabled, and preventing normal operation of the integrated circuit. The normal operation of the integrated circuit can be prevented by putting the integrated circuit into an error or halt state. The interface can be a debugging interface. The at least one CSP can include a public/private pair of encryption keys.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

For the purposes of explanation, the ensuing numerous provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments provided herein are examples only, and is not intended to limit the scope, applicability, or configuration of the disclosure. Rather, the ensuing description of the embodiments will provide those skilled in the art with an enabling description for implementing one or more embodiments. It should be understood that various changes may be made in the function and arrangement of elements without departing from the spirit and scope of the disclosed systems and methods as set forth in the appended claims.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Embodiments provided herein include techniques for generating and securing critical security parameters (CSPs), such as cryptographic keys, authentication data, or other sensitive data, on an integrated circuit (IC), such as a microcontroller or microprocessor. The self-policing techniques disclosed can help prevent developers and/or manufacturers from intentionally or unintentionally compromising (e.g., resetting, erasing, replacing, retrieving, replicating, etc.) a CSP on an IC.

Figure 1:
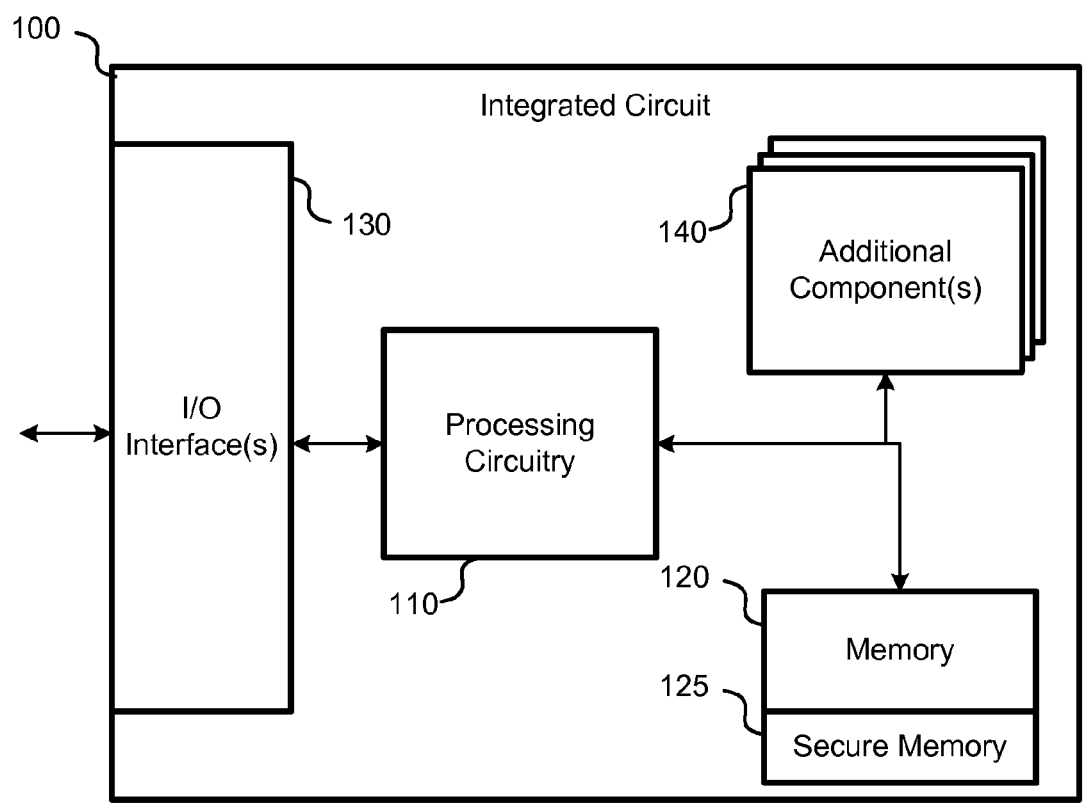
FIG. 1 is a simplified block diagram of an integrated circuit (IC) capable of utilizing the techniques provided herein, according to one embodiment.

FIG. 1 is a simplified block diagram of an IC 100, according to one embodiment. Components of the IC 100 can vary, depending on the type of IC 100, but can generally include processing circuitry 110, memory 120 (including secure memory 125), one or more I/O interface(s) 130, and additional component(s) 140. Other embodiments of an IC 100 may include more, less, and/or different components, depending on desired functionality.

The I/O interface(s) 130 can enable the IC 100 to communicate with external systems and/or devices through, for example, an external bus. The I/O interface(s) 130 also can include a debug interface, such as a Joint Test Action Group (JTAG) (or IEEE 1149.1) debug port. According to some embodiments, the debug and/or other interfaces can be disabled by a user. For example, a user may be able to disable the debug interface after installing software onto the IC 100. These embodiments may also allow code internal to the IC to verify that the debug and/or other interfaces have been disabled. According to some embodiments, the I/O interface(s) 130 can enable the IC 100 to deliver—manually and/or automatically—a CSP generated by the IC 100 to an external entity.

The capacity and/or functionality of the memory 120 can vary, depending on the type of IC 100, desired functionality, and/or other factors. The memory 120 can include, for example, volatile and/or non-volatile data storage (RAM, ROM, EPROM, EEPROM, Flash memory, and the like) that can be utilized as a working memory (e.g., cache, buffer, etc.) and/or storage for software, firmware, and other machine code.

Embodiments also can include secure memory 125. The secure memory can comprise one or more portions of the memory 120 with restricted access. That is, access to the secure memory 125 can be restricted such that the contents of the secure memory 125 cannot be read or otherwise conveyed to an entity external to the IC 100. In some embodiments, the secure memory 125 can, for example, store a CSP (e.g., a private encryption key) and prevent it from being read and/or modified during normal operation of the IC 100. Thus, the secure memory 125 can be protected from internal code executed by the IC 100 itself. Moreover, some embodiments utilize ICs 100 that can verify whether certain areas of memory 120 are secure (i.e., whether certain areas of memory 120 comprise part of the secure memory 125).

The processing circuitry 110 of the integrated circuit 120 includes circuitry capable of executing various commands and/or processes. The form and function of the processing circuitry 110 can vary depending on the type of IC 100, desired functionality, and/or other factors. For example, the processing circuitry 110 of a microcontroller can include a processing core, core logic, and/or the like configured to execute software, firmware, and/or other machine-executable code. On the other hand, processing circuitry 110 for a microprocessor may include, for example, an execution unit, arithmetic logic unit (ALU), shifters, control logic, and/or the like. Application-specific ICs (ASICs) and other types of ICs may have other processing circuitry 120 capable of executing specific commands and/or logic. According to some embodiments, the processing circuitry 110 of the IC 100 is capable of generating a CSP. Additionally or alternatively, the CSP may be generated by another component, such as a specific CSP-generating module within the IC 100.

FIG. 1 is provided only as a simplified example embodiment. Other embodiments may include additional and/or alternative components. As such, the additional component(s) 140 may include any of a variety of components, depending on desired functionality. Such components can include, for example, registers, controllers, control units, counters, clocks, debug circuitry, glue logic, field-programmable logic, caches, buffers, memory management units (MMUs), and/or the like. As suggested previously, depending on desired functionality, the additional component(s) may include a module (e.g., dedicated circuitry and/or machine-readable code) for CSP generation and/or management. A person of ordinary skill in the art will recognize many additions, omissions, substitutions, and alterations.

Figure 2:
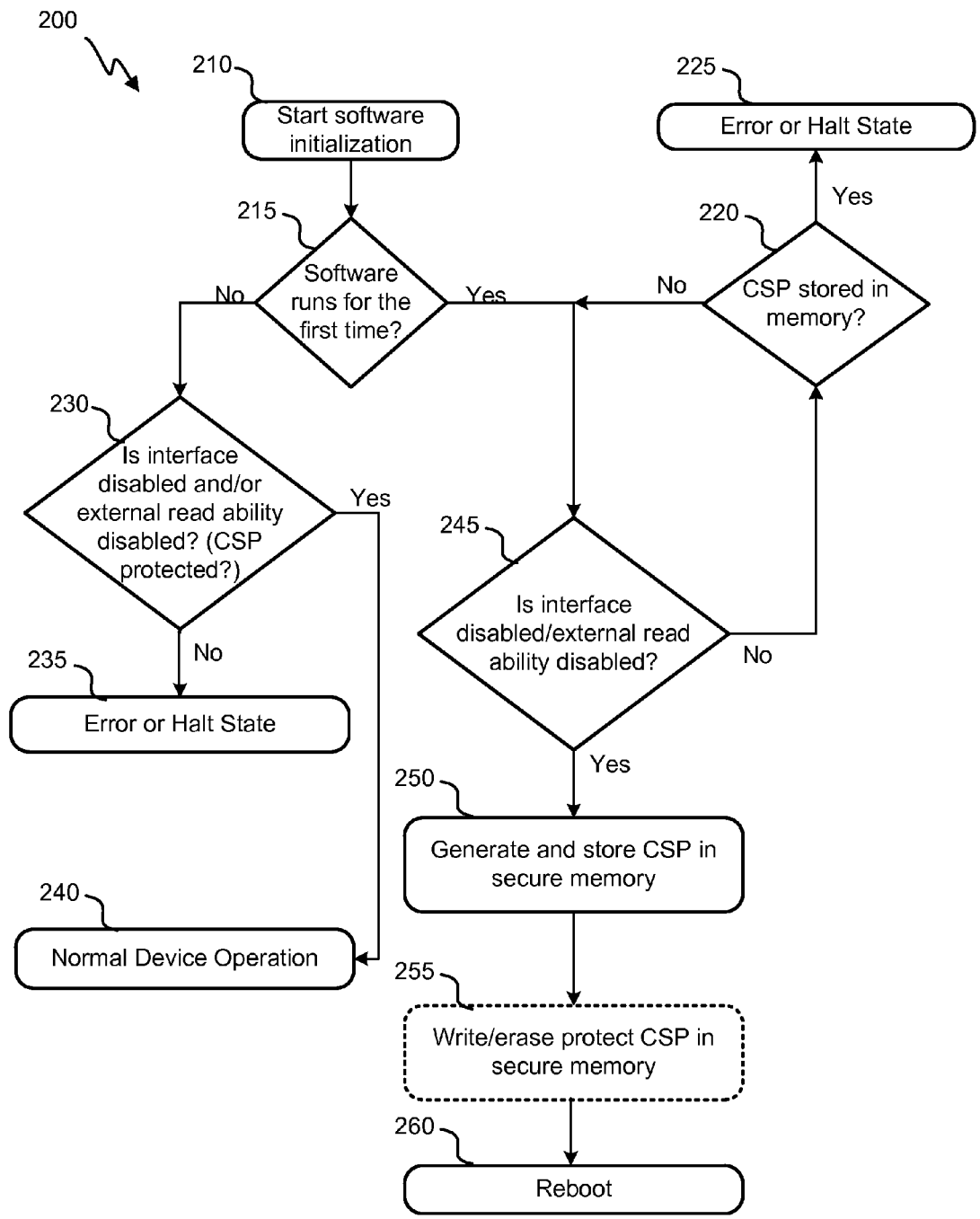
FIG. 2 is a flowchart representing a method for secure CSP self-generation, according to one embodiment.

FIG. 2 is a flowchart representing a method 200 for secure CSP self-generation, according to one embodiment that utilizes software to execute the method. The method, which can be executed by one or more of the components of the IC 100 shown on FIG. 1, can begin at block 210, where software initialization is started. Such initialization can occur, for example, when an IC is initially powered up.

At block 215, a determination is made whether the software is running for the first time. As indicated previously, modern microprocessors and microcontrollers can include the ability to detect whether the software is running for the first time. Moreover, a simple software flag and/or other indicator can be set the first time the software is run to help make this determination. In embodiments utilizing means other than software, other indicators and/or devices may be utilized to determine whether the process is being executed for a first time.

If it is determined that the software is being run for the first time, the process then moves to block 245, where it is determined whether an interface is disabled and/or an external read ability is otherwise disabled. Here, an IC can, for example, determine whether a debug interface has been disabled and/or whether there are any other means by which a CSP—or a data location in which a CSP may be stored—is readable by an entity external to an IC. Because different ICs may have different interfaces, software, functionality, etc., the process of determining whether an external read ability has been disabled may vary between different ICs.

At block 220, if it has been determined that the external read ability is not disabled, then the IC can check to see if the CSP is stored in memory. If there is no CSP in memory, the method can simply wait until the external read ability is disabled. Otherwise, if there is a CSP in memory, the IC can enter an error or halt state, at block 225.

At block 250, if it is determined that the external read ability is disabled, a CSP can be generated and stored in secure memory (or otherwise prevented from being read and/or manipulated by an external source). As indicated previously, the CSP may include any of a variety of sensitive values (e.g., a public/private cryptographic key pair, symmetric keys, a password, etc.).

Optionally, at block 255, the CSP can be write/erase protected in the secure memory (or similar data location). Such a step can help ensure that the CSP is protected from manipulation. Depending on desired functionality, IC type, and/or other factors, the write/erase protection may include measures that permanently prevent the CSP from being altered.

The method 200 can then proceed to block 260, where the IC is subject to a reboot. This time, the software is not being run for the first time.

In such a case, and in all cases in which the software is not being run for the first time, the method moves from block 215 to block 230, where it is determined whether an interface (e.g., a debug interface) is disabled and/or an external read ability has otherwise been disabled. Optionally, depending on the embodiment, the type of CSP, and/or the desired functionality, block 230 also can determine whether the CSP has been protected (e.g., write/erase protected). If so, the method 200 can proceed to block 280, where the IC is subject to normal device operation (i.e., normal IC functionality). Some embodiments may additionally include a step (not shown) in which the CSP may be securely transmitted—manually and/or automatically—to an entity external to the IC.

If, at block 230, it is determined that an interface is not disabled, or another external read ability has not been disabled, then the method can proceed to block 235, where the IC is put in an error or halt state. Other embodiments may put the IC in other states that would prevent the IC from normal operation. Ultimately, the method 200 identifies a vulnerability that could potentially compromise the security of a CSP of an IC and prevents the IC from functioning under conditions that would allow this vulnerability to persist.

Figure 3:
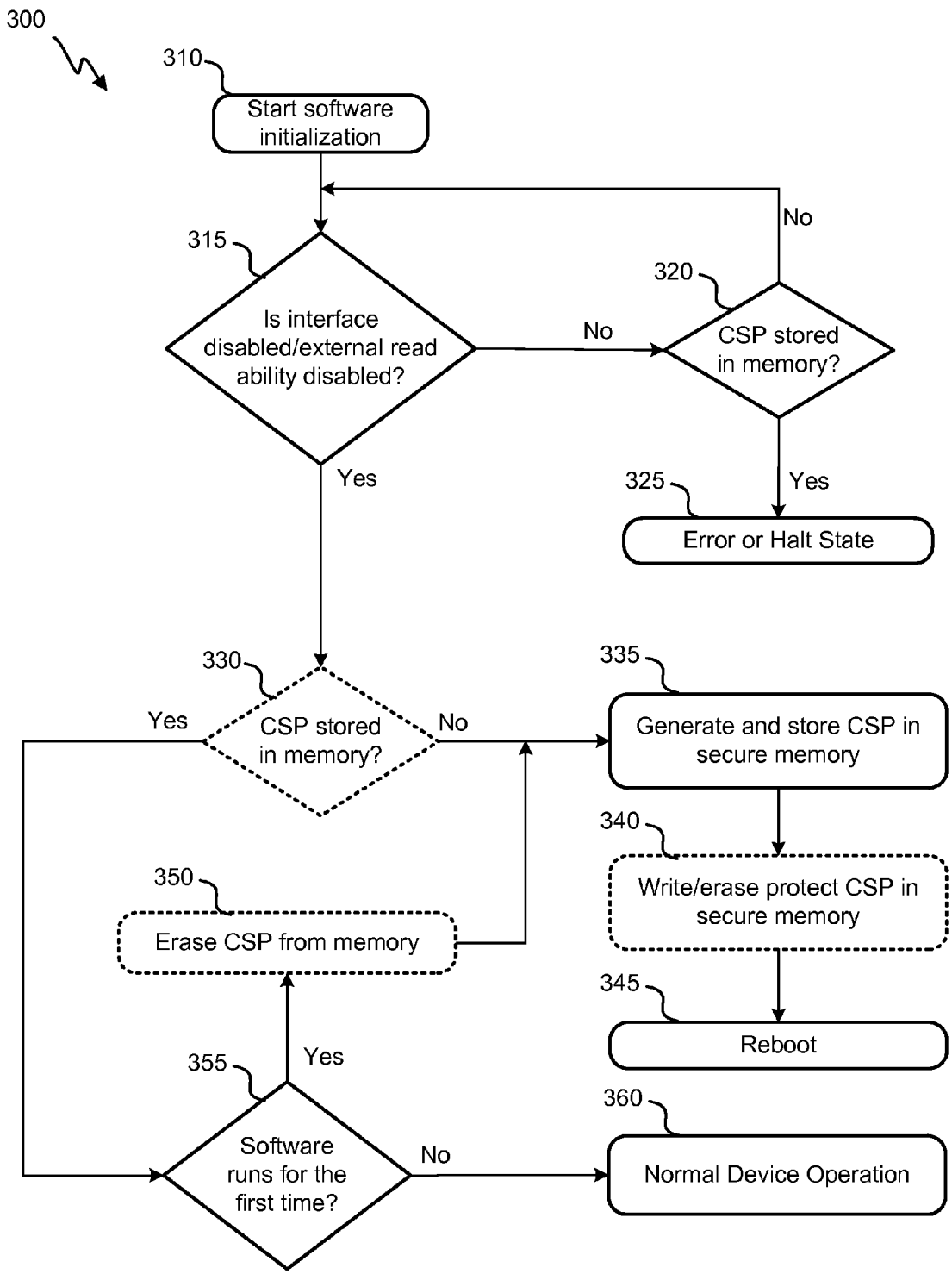
FIG. 3 is a flowchart representing a method for secure CSP self-generation, according to another embodiment.

FIG. 3 is a flowchart representing a method 300 for secure CSP self-generation, as an alternative embodiment to the method 200 shown in FIG. 2. The method 300 of FIG. 3 could be performed, for example, in embodiments in which an IC is able to regenerate a CSP. The method can begin at block 310, where software initialization is started. Again, such initialization can occur, for example, when an IC is initially powered up.

At block 315, similar to block 230 of FIG. 2, a determination is made whether an interface is disabled and/or an external read ability is otherwise disabled. Again, this determination can include determining whether a debug interface has been disabled and/or whether there are any other means by which a CSP—or a data location in which a CSP may be stored—is readable by an entity external to an IC.

At block 320, if it has been determined that the external read ability is not disabled, then the IC can check to see if the CSP is stored in memory. If there is no CSP in memory, the method can simply wait until the external read ability is disabled. Otherwise, if there is a CSP in memory, the IC can enter an error or halt state, at block 325.

Optionally, at block 330, it is determined whether a CSP is stored in memory (e.g., secure memory). This can include reading the CSP itself, if possible, and/or utilizing a software flag and/or other indicator that a CSP has been stored in memory. If so, the method 300 can include, at block 355, determining whether the software is running for the first time. If not, the method 300 can simply proceed to normal device operation, at block 360. Otherwise, the CSP can be erased from the memory, at block 350, in configurations in which the CSP is erasable. Other embodiments, however, can ignore and/or rewrite over any CSP that may be stored in memory. In either case, the CSP is generated and stored in secure memory at block 335.

As with the method 200 of FIG. 2, the method 300 of FIG. 3 can optionally include block 340, in which the CSP can be write/erase protected in the secure memory (or similar data location). This may include temporary write/erase protection while the IC is powered such that the CSP may be erased and/or overwritten if the IC is subsequently restarted.

With the CSP generated and stored in memory, the method 300 can then proceed to block 345, where the IC is rebooted. If the external read ability of the IC is disabled, the IC will proceed to normal device operation, at block 360 after being rebooted.

It should be appreciated that the specific steps illustrated in FIGS. 2-3 provide example flowcharts illustrating methods for secure CSP generation. Alternative embodiments may include alterations to the embodiments shown. For example, alternative embodiments may include differing techniques for determining whether an external read ability has been disabled. Other embodiments may include different forms of generating and/or storing a CSP. Furthermore, additional features may be added or removed depending on the particular applications. One of ordinary skill in the art would recognize many variations, modifications, and alternatives.

Figure 4:
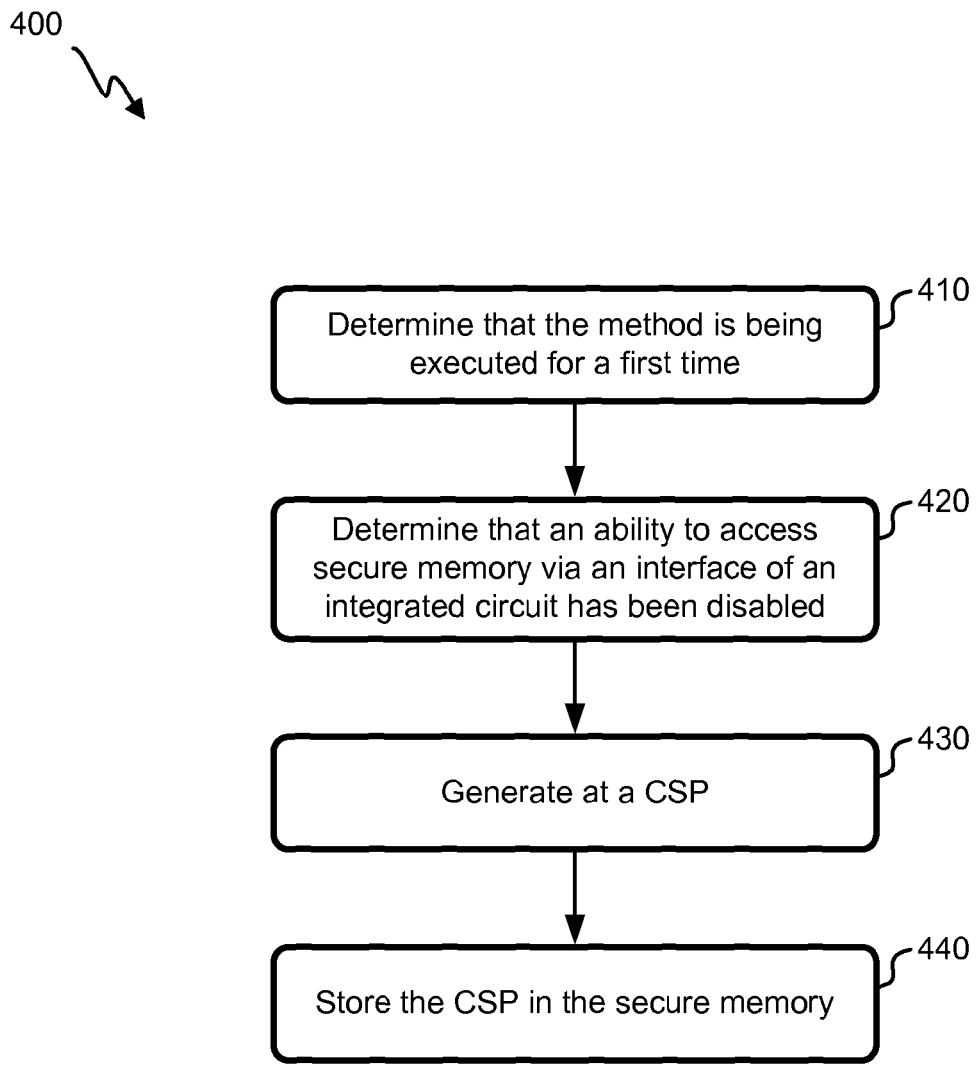
FIG. 4 is a simplified flow sequence outlining a method for executing a secure CSP generation utilizing the techniques provided herein, according to one embodiment.
Figure 5:
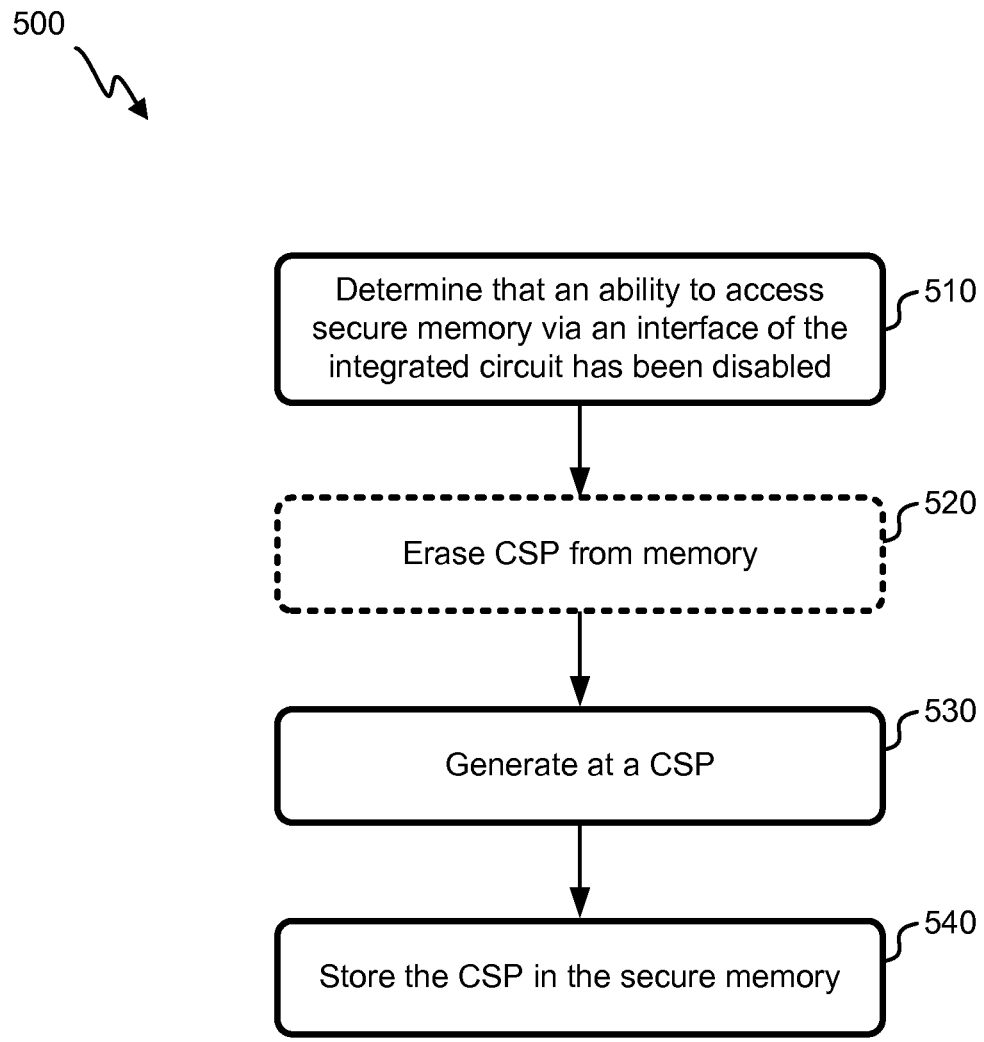
FIG. 5 is a simplified flow sequence outlining a method for executing a secure CSP generation utilizing the techniques provided herein, according to another embodiment.

FIGS. 4 and 5 provide simplified flow sequences corresponding to aspects of the flowcharts depicted in FIGS. 2 and 3, respectively. FIG. 4, for example, illustrates a sequence outlining a method 400 for executing a secure CSP generation utilizing the techniques provided herein, according to one embodiment.

The method 400 can begin at block 410, where it is determined that the method is being executed for the first time. As detailed herein, this determination can utilize software flags, hardware indicators, and/or other techniques, depending on the desired functionality of the embodiment.

At block 420, it is determined that an ability to access secure memory via an interface of an IC has been disabled. As described herein above, this can include an internal self-check by an IC to determine if a debug interface has been disabled. Additionally or alternatively, embodiments may include checking other aspects of an IC to determine whether a CSP is protected from being read from and/or transmitted to an entity external to the IC.

At block 430, a CSP is generated. The CSP can be generated by, for example, processing circuitry of the IC and/or a module configured for CSP generation. Once the CSP is generated, it can be stored in secure memory of the IC, at block 440.

FIG. 5, illustrates a sequence outlining a method 500 for executing a secure CSP generation utilizing the techniques provided herein, according to another embodiment. At block 510, similar to block 420 of FIG. 4, it is determined that an ability to access secure memory via an interface of an IC has been disabled. Again, embodiments may include checking other aspects of an IC to determine whether a CSP is protected from being read from and/or transmitted to an entity external to the IC.

Optionally, at block 520, a CSP can be erased from memory. As indicated in FIG. 3, this can include a determination of whether there is a CSP stored in memory. Alternatively, this can be done as part of an automatic process to ensure a CSP stored in memory is not compromised.

At block 530, a CSP is generated. And, at block 540, the CSP is stored in secure memory. In some embodiments, storing the CSP in secure memory may involve overwriting a CSP previously stored in the secure memory.

It should be appreciated that the specific steps illustrated in FIGS. 4-5 provide example sequences illustrating methods for secure CSP generation. Alternative embodiments may include alterations to the embodiments shown. For example, alternative embodiments may include additional steps for ensuring the CSP is write/erase protected. Furthermore, additional features may be added or removed depending on the particular applications. One of ordinary skill in the art would recognize many variations, modifications, and alternatives.

The techniques provided herein can provide one or more advantages over conventional techniques, such as secure manufacturing, cheaper manufacturing, and/or protection from malicious actions by developers or a manufacturer. Additional advantages can include elimination or reduction of the need for key change (i.e., less maintenance), protection from unknown errors in the software, and/or the ability to avoid the use of secure third-party devices such as SIM cards that could require extra cost and power consumption. Moreover, embodiments can be utilized in a wide variety of applications in which security is critical, but where the IC does not need to maintain several identities, such as in SIM/mobile device case.

Embodiments can be utilized in a variety of applications and/or support a variety of features. For example embodiments can support internal symmetric key generation which provides microprocessor communication with the periphery. Embodiments further can support private/public key pair generation where the private key is protected (e.g., written to secure memory) and the public key is exposed. Embodiments also can support external symmetric key generation. In this latter scenario, a symmetric key subsequently can be shared with a Key Management System (KMS) using a hard-coded KMS public key stored in the software.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable instructions, such as programming code, which may be used to cause a machine, such as a general-purpose or special-purpose processor or logic circuits programmed with the instructions to perform the methods. These machine-readable and/or computer-readable instructions may be stored on one or more non-transitory storage mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A computer-implemented method for providing secure critical security parameter (CSP) generation for an integrated circuit, the method comprising:
   determining that an interface operable to provide access to a secure memory of the integrated circuit is disabled;
   detecting that a first CSP is stored in a memory of the integrated circuit, wherein detecting that the first CSP is stored in the memory is done in response to determining that the interface is disabled;
   determining that the computer-implemented method is being executed by the integrated circuit for a first time; and
   performing the following operations in response to determining that the method is being executed by the integrated circuit for a first time:
      erasing the first CSP from the memory;
      generating a second CSP; and
      storing the second CSP in the secure memory of the integrated circuit.

2. The computer-implemented method for providing CSP generation for an integrated circuit as recited in claim 1, further comprising protecting the second CSP from being erased from the secure memory of the integrated circuit.

3. The computer-implemented method for providing CSP generation for an integrated circuit as recited in claim 1, further comprising:
 determining that the interface is not disabled subsequent to a reboot of the integrated circuit; and
 preventing normal operation of the integrated circuit.

4. The computer-implemented method for providing CSP generation for an integrated circuit as recited in claim 3, wherein the normal operation of the integrated circuit is prevented by putting the integrated circuit into an error or halt state.

5. The computer-implemented method for providing CSP generation for an integrated circuit as recited in claim 1, wherein the interface of the integrated circuit is a debugging interface.

6. The computer-implemented method for providing CSP generation for an integrated circuit as recited in claim 1, wherein the second CSP comprises a public/private pair of encryption keys.

7. The computer-implemented method for providing CSP generation for an integrated circuit as recited in claim 1, wherein the second CSP is generated by the integrated circuit.

8. The computer-implemented method for providing CSP generation for an integrated circuit as recited in claim 1, further comprising rebooting the integrated circuit after storing the second CSP in the secure memory of the integrated circuit.

9. A non-transitory computer-readable medium having instructions embedded thereon for providing secure critical security parameter (CSP) generation for an integrated circuit, the instructions including computer-executable code for:
 determining that an interface operable to provide access to a secure memory of the integrated circuit is disabled;
 detecting that a first CSP is stored in a memory of the integrated circuit, wherein detecting that the first CSP is stored in the memory is done in response to determining that the interface is disabled;
 determining that the computer-executable code is being executed by the integrated circuit for a first time;
 performing the following operations in response to determining that the computer-executable code is being executed by the integrated circuit for a first time:
  erasing the first CSP from the memory;
  generating a second CSP; and
  storing the second CSP in the secure memory of the integrated circuit.

10. The non-transitory computer-readable medium recited in claim 9, further comprising computer-executable code for protecting the second CSP from being erased from the secure memory of the integrated circuit.

11. The non-transitory computer-readable medium recited in claim 9, further comprising computer-executable code for:
 determining that the interface is not disabled subsequent to a reboot of the integrated circuit; and
 preventing normal operation of the integrated circuit.

12. The non-transitory computer-readable medium recited in claim 11, wherein the computer-executable code for preventing the normal operation of the integrated circuit includes computer-executable code for putting the integrated circuit into an error or halt state.

13. The non-transitory computer-readable medium recited in claim 9, wherein the interface of the integrated circuit is a debugging interface.

14. The non-transitory computer-readable medium recited in claim 9, wherein the second CSP comprises a public/private pair of encryption keys.

15. An integrated circuit capable of securely generating a critical security parameter (CSP), the integrated circuit comprising:
 a secure memory;
 an interface; and
 processing circuitry, coupled to the secure memory and the interface, and configured to execute a process, wherein the process comprises:
  determining that an interface operable to provide access to a secure memory of the integrated circuit is disabled;
  detecting that a first CSP is stored in a memory of the integrated circuit, wherein detecting that the first CSP is stored in the memory is done is response to determining that the interface is disabled;
  determining that the initial process is being executed by the processing circuitry for a first time;
  performing the following operations in response to determining that the process is being executed by the processing circuitry for a first time:
  erasing the first CSP from the memory;
  generating a second CSP; and
  storing the second CSP in the secure memory of the integrated circuit.

16. The integrated circuit capable of providing CSP generation as recited in claim 15, wherein the processing circuitry is configured to protect the second CSP from being erased from the secure memory.

17. The integrated circuit capable of providing CSP generation as recited in claim 15, wherein the process further comprises:
 determining that the interface is not disabled subsequent to a reboot of the integrated circuit; and
 preventing normal operation of the integrated circuit.

18. The integrated circuit capable of providing CSP generation as recited in claim 17, wherein the normal operation of the integrated circuit is prevented by putting the integrated circuit into an error or halt state.

19. The integrated circuit capable of providing CSP generation as recited in claim 17, wherein the interface is a debugging interface.

20. The integrated circuit capable of providing CSP generation as recited in claim 15, wherein the second CSP comprises a public/private pair of encryption keys.

* * * * *